US007086469B2

(12) United States Patent
Metcalf et al.

(10) Patent No.: US 7,086,469 B2
(45) Date of Patent: Aug. 8, 2006

(54) INCREASING REACTION EFFICIENCY OF ACETIC ACID

(75) Inventors: Arthur S. Metcalf, Tomball, TX (US); Joel L. Boles, Spring, TX (US); Carson P. Parker, Houston, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 10/871,108

(22) Filed: Jun. 18, 2004

(65) Prior Publication Data
US 2005/0194147 A1    Sep. 8, 2005

Related U.S. Application Data

(60) Provisional application No. 60/549,632, filed on Mar. 3, 2004.

(51) Int. Cl.
*E21B 43/27* (2006.01)
*E21B 43/26* (2006.01)
*E21B 37/00* (2006.01)

(52) U.S. Cl. .................. 166/307; 166/308.2; 166/312; 166/902; 507/267; 507/923; 507/934

(58) Field of Classification Search ............... 166/307, 166/308.2, 312, 902; 507/267, 923, 934
See application file for complete search history.

(56) References Cited

U.S. PATENT DOCUMENTS 4,646,835 A * 3/1987 Watkins et al. ............. 166/295

5,547,023 A * 8/1996 McDaniel et al. ......... 166/280.1
6,165,947 A * 12/2000 Chang et al. ............... 507/216

OTHER PUBLICATIONS

Nasr-El-Din, H.A; Lynn, J.D.; Taylor, K.C.; "Lab Testing and Field Application of a Large-Scale Acetic Acid-Based Treatment in a Newly Developed Carbonate Reservoir"; SPE 65036; presented at the 2001 SPE International Symposium on Oilfield Chemistry, Houston, Feb. 13-16, 2001.
Fredd,C.N.; Fogler, H.S.; "Alternative Stimulatiion Fluids and Their Impact on Carbonate Acidizing"; SPE Journal, Mar. 1998; pp. 34-41; Society of Petroleum Engineers, Inc.; USA.

(Continued)

*Primary Examiner*—George Suchfield
(74) *Attorney, Agent, or Firm*—John Wilson Jones; Jones & Smith, LLP

(57) ABSTRACT

A method for removing or dissolving calcareous materials in a subterranean formation or in a wellbore consists of two basic steps. In the first step, an aqueous acid solution is injected into the formation or wellbore. The aqueous acid solution contains between from about 15 to about 99 weight percent of an organic acid selected from formic acid, acetic acid or a mixture of formic acid and acetic acid. Water or brine is then injected into the formation or wellbore. The amount of water or brine injected into the formation or wellbore is an amount sufficient to reduce the concentration of organic acid in the formation or wellbore to no greater than 10 weight percent.

31 Claims, 7 Drawing Sheets

OTHER PUBLICATIONS

Williams; B.B.; Gidley, J.L.; Schechter, R.S.; "Acidizing Fundamentals"; Monograph vol. 6; SPE; 1979; pp. 10-18; Society of Petroleum Engineers, Inc. USA.

Huang T.; Hill, A.D.; Schechter, R.S.; "Reaction Rate and Fluid Loss: The Keys to Wormhole Initiation and Propagation in Carbonate Acidizing"; paper SPE 37312 presented at the SPE International Symposium on Oilfield Chemistry, Houston, Feb. 18-21, 1997.

Huang, T.; Ostensen, L.; Hill, A.D.; "Carbonate Matrix Acidizing with Acetic Acid"; paper SPE 58715; presented at 2000 SPE International Symposium on Formation Damage Control, Lafayette, Feb. 23-24-2000.

Rietjens, M.; "Sense and Non-Sense about Acid-Induced Sludge"; paper SPE 38163 presented at 1997 SPE European Formation Damage Conference, The Hague; Jun. 2-3, 1997.

Nierode, D.E.; Williams, B.B.; "Characteristics of Acid Reaction in Limestone Formations"; paper SPE 3101 presented at the SPE 45th Annual Technical Conference and Exhibition, Houston; Oct. 4-7; 1971.

Fredd, C.N; Fogler, H.S.; "The Kinetics of Calcite Dissolution in Acetic Acid Solutions"; Chemical Engineering Science, vol. 53, No. 22, pp. 3863-3874; Oct. 1998; Elsevier Science Ltd.; Great Britain.

Chatelain, J.C.; Silberberg, T.H.; Schechter, R.S.; "Thermodynamic Limitations in Organic Acid-Carbonate Systems"; paper SPE 5647 presented at the SPE 50th Annual Technical Conference & Exhibition, Dallas; Sep. 28-Oct. 1, 1975.

Buijse, M.; De Boer, P.; Breukel, B.; Klos, M.; Burgos, G. "Organic Acids in Carbonate Acidizing"; paper SPE 82211 presented at the 2003 European Formation Damage Conference; The Hague; May 13-14, 2003.

* cited by examiner

INCREASING REACTION EFFICIENCY OF ACETIC ACID

This application claims the benefit of U.S. patent application Ser. No. 60/549,632, filed on Mar. 3, 2004.

FIELD OF THE INVENTION

The present invention relates generally to a method for removing or dissolving calcareous materials in a subterranean formation or in a wellbore using an aqueous acid solution.

BACKGROUND OF THE INVENTION

Dissolution of carbonates by acid has been practiced in a number of industries for years. For instance, well completions, cleanout and stimulation operations in wells and subterranean carbonate formations have used organic acids because of their low corrosivity. Such acids may be useful in the removal of calcareous materials deposited as scales within the formation during production of fluids at a variety of interstices of the formation rock itself as the fluid moves towards a well, in the production conduit of the well or in the fluid-handling equipment at the surface.

Further, more significant control of highly branched flow channels (called "wormholes"), created during acid matrix stimulation or acid fracturing of carbonate reservoirs, such as limestone, chalk and dolomite, have been observed using weak organic acids rather than hydrochloric acid, HCl. Further, use of a weak organic acid, such as acetic acid, permits for lower, and optimal, injection rate for wormhole generation, as well as the generation of larger wormholes. The slower reaction rates of weak organic acids also allow for retardation and, therefore, deeper penetration into the reservoir by the acid.

Under high temperature and pressure conditions, utilization of acids and acid choices becomes very selective because of corrosion control issues. Acetic acid has been preferred because of its low corrosivity property. However, reactivity of acetic acid under such conditions decreases dramatically due to a reduction in its dissociation constant. As set forth in Table I, as compared to HCl, under high temperature conditions, the dissociation constant of acetic acid, as well as formic acid, is reduced:

TABLE I

| Acid Name | Dissociation Constant | | |
|---|---|---|---|
|  | 25° C. | 75° C. | 125° C. |
| Acetic | $1.754 \times 10^{-5}$ | $1.398 \times 10^{-5}$ | $7.541 \times 10^{-6}$ |
| Formic | $1.772 \times 10^{-4}$ | $1.399 \times 10^{-4}$ | $7.041 \times 10^{-5}$ |
| Hydrochloric | 10 | | |

Reaction efficiency of acetic acid, reported in the literature, demonstrates a range in values from 90% at 25° C. (77° F.) to 40% at 121° C. (250° F.) for 0.34 to 2.94 molal solutions (2 to 15 wt %).

The reaction of acetic acid and calcium carbonate is believed to proceed as follows:

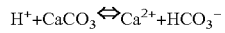

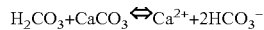

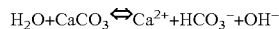

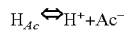

When the partial pressure of carbon dioxide (a reaction product of carbonate and acetic acid) is low and the pH is low, the first equation dominates and when the pH is high, the third equation dominates. The second equation dominates the dissolution of calcite when the partial pressure of carbon dioxide is greater than 0.1 atmospheres and the pH is greater than 5

Chatelain et al., "Thermodynamic Limitations in Organic Acid-Carbonate Systems," paper 5647 presented at the SPE 50th Annual Technical Conference and Exhibition, Dallas, Sep. 28–Oct. 1, 1975, reported a method of determining the extent of organic acid reaction on carbonate rock by thermodynamic equilibrium. Increased temperature and acid strength were disclosed to decrease conversion or reaction of organic acids on calcium carbonate. From their work, which involved the circulation of an acid with known initial strength through carbonate rock until equilibrium was attained, an approximation of the fraction of acid converted could be determined from the equation:

$$1.6 \times 10^4 K_D = \frac{c_{CaA_2} c_{CO_2}}{c_{HA}} \qquad (I)$$

wherein $K_D$ is the acid dissociation constant and C represents the concentration of the designated component in molality (gmole/kg water). See further Williams, B. B., Gidley, J. L. and Schechter, R. R.: Acidizing Fundamentals, Monograph Volume 6, SPE. In the actual stimulation of carbonate reservoirs however, no circulation occurs, only the injection of an acid system followed by a soaking or reaction period, followed by recovery. During the soaking period, equilibrium likely is attained.

Apparent from Chatelain's data is the fact that as acid strength is reduced, reactivity is increased. FIG. 1 shows the data published by Chatelain as the percent of initial acid strength converted and, in particular, shows the 2 wt % acetic acid curve being 65% converted at 121° C. (250° F.) and the 10 and 15 wt % acetic acid curves being 39 to 42% converted, respectively. Based upon equation (I), a 29 wt. percent acetic acid solution would be expected to convert 52%, 38.5% and 32.6% at 25° C., 75° C. and 125° C., respectively.

Since the disclosure of Chatelain, research has been consistently undertaken to develop means to improve upon the dissolution of carbonates. In particular, methods of increasing the reactivity of organic acids for use in carbonate formations and wellbores is desired in order that an increase in the amount of dissolution of carbonates can be attained.

SUMMARY OF THE INVENTION

The invention relates to a method for removing or dissolving calcareous materials, preferably carbonate materials, in a subterranean formation, preferably a carbonate formation, or in a wellbore. In the method, an aqueous acid solution is injected into the formation or wellbore. The aqueous acid solution contains between from about 15 to about 99 weight percent of an organic acid selected from formic acid, acetic acid or a mixture of formic acid and acetic acid. Water or brine is then injected into the formation or wellbore. The amount of water or brine injected into the formation or wellbore is an amount sufficient to reduce the concentration of organic acid in the formation or wellbore to no greater than 10 weight percent.

In a preferred embodiment, the invention relates to a method for removing calcareous scales from a wellbore.

The invention further relates a method for enhancing the production of a subterranean formation, preferably a carbonate formation, by injecting into the formation the aqueous acid solution as described above. Water (optionally in the form of brine) is then injected into the formation in an amount sufficient to reduce the concentration of organic acid in the formation. The amount of water introduced into the formation is an amount sufficient to dilute the volume percent of the injected organic acid solution to at least between from about 2 to about 20 times its initial volume. In a preferred embodiment, the amount of water injected into the formation is an amount sufficient to reduce the concentration of organic acid in the formation to no greater than 10 weight percent.

In a preferred embodiment, the invention relates to a method for acid fracturing subterranean formations, preferably carbonate formations, surrounding oil and gas wells. In addition, the invention relates to matrix acidizing techniques.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
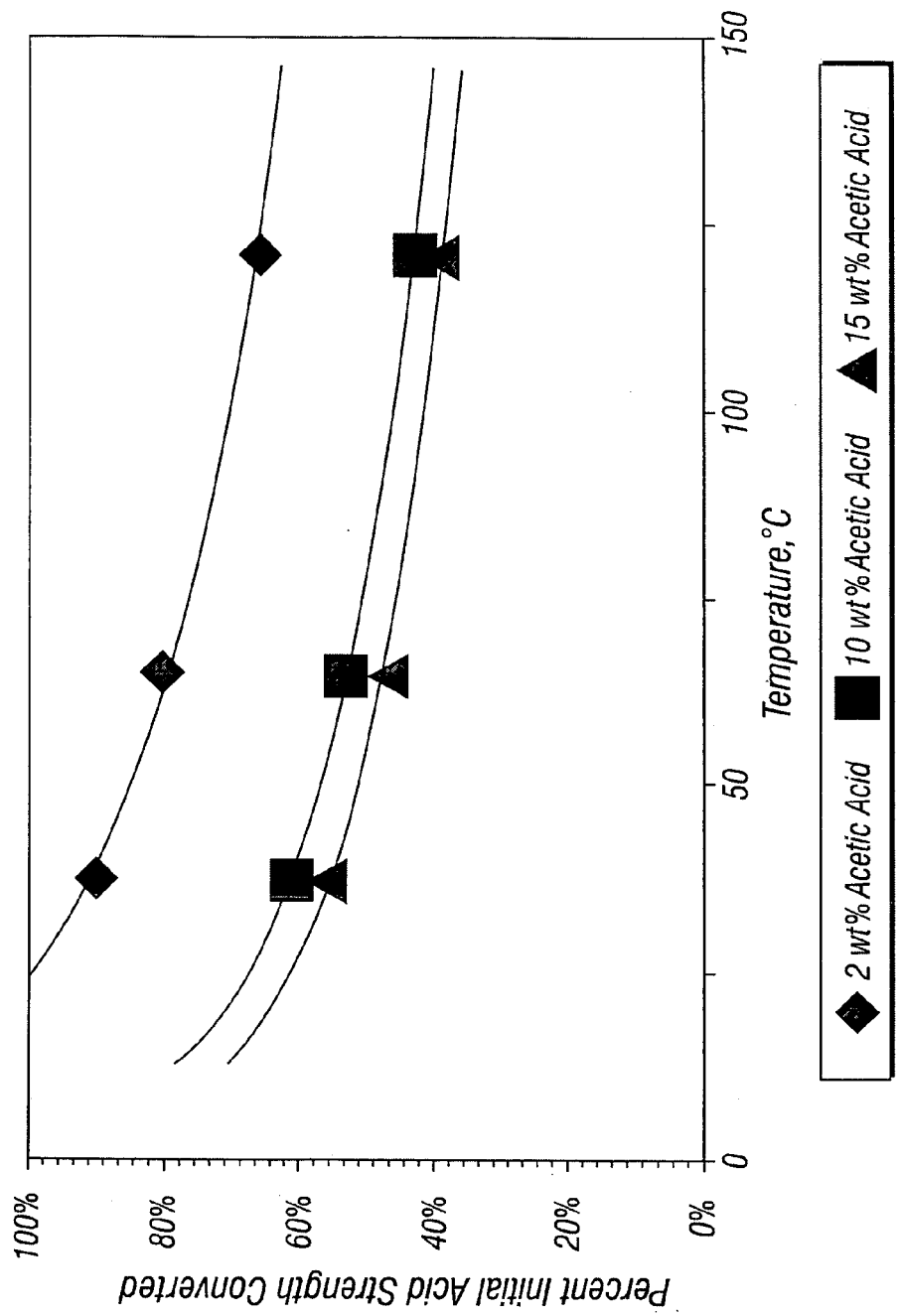
FIG. 1 demonstrates the fraction of acetic acid reacted at equilibrium versus temperature for an acetic acid/calcium carbonate system in accordance with the teachings of the prior art.

Calcareous materials may be removed or dissolved from subterranean formations or wellbores in accordance with the method of the invention. The subterranean formation is preferably a carbonate formation and the calcareous materials may be any inorganic calcium containing material, preferably carbonates, such as calcite or calcium carbonate scales.

In the method, an aqueous organic acid solution is injected into the subterranean formation or into the wellbore. The aqueous acid solution injected into the formation or wellbore typically contains between from about 15 to about 99 weight percent of formic acid, acetic acid or a mixture of formic and acetic acid. Where the acid employed contains acetic acid, the amount of acid solution injected into the formation or wellbore is typically between from about 25 to about 99, preferably between from about 25 to about 35 weight percent, acetic acid. Where the acid employed contains formic acid, the amount of acid solution injected into the formation or wellbore is typically between from about 15 to about 95, preferably between from about 20 to about 40, weight percent formic acid. Upon the full consumption of the acid, the pH of the system approaches about 7.0.

Subsequent to the injection of the organic acid solution into the subterranean formation or wellbore, water or brine is injected. The amount of water (or brine) injected is sufficient to reduce the concentration of organic acid in the formation or wellbore to no greater than 10, preferably no greater than 5, more preferably no greater than 3, most preferably no greater than 2, weight percent. Typically, the volume of water or brine injected into the subterranean formation or wellbore is an amount sufficient to dilute the volume percent of the injected organic acid solution to at least between from about 2 to about 20 times the initial volume.

Dilution of the organic acid solution lowers the strength of the acid and causes the equilibrium, defined by the dissociation constant, to shift; thereby resulting in greater efficiency. The process of the invention renders an organic acid efficiency increase of at least 10%, generally as high as 50%, over the methods or the prior art.

Dissolution of the calcareous materials is improved by reduction of the injection rate of the acid and water/brine solutions. Thus, maximum efficiency of the organic acid solution is typically observed at reduced injection rates. For instance, a reduction in the injection rate from 20 to 5 ml/min evidences an improvement in dissolution of calcareous materials. This phenomenon is discussed in relation to FIG. 5 below.

The water or brine is preferably fresh water, sea water or brine.

In a preferred embodiment, the organic acid solution is used to treat a carbonate formation or carbonate, such as calcite or calcium carbonate, scales in a wellbore. The pumping of the water into the formation or the wellbore behind the acid facilities the mixing and the dilution of the acid solution, thereby increasing its reactivity.

The process of the invention may further be used to enhance the productivity of a subterranean formation. The reactivity of the acid solution provides uniform treatment of the target interval, as well as beneficially creating a greater number of wormholes, relative to what can be achieved with the acid treatments of the prior art.

The process of the invention may further be used to acid fracture a subterranean formation wherein the fracture face is etched with acid such that flow channels remain in the formation after the formation is returned to production through which the fluids contained in the formation flow to the wellbore. The acid solution, prior to injection of the water or brine, may be combined with other acid fracturing fluids known in the art, such as polymer gels.

The inventive process has particular applicability in acidizing. In acidizing, fractures are created and contacted with an acid solution which, in turn, forms channels in the formation. The acid solution is pumped into the formation at a rate and pressure sufficient to flow through the channels. The channels are thereby enlarged. Such procedures are disclosed in U.S. Pat. Nos. 3,768,564 and 4,836,284, herein incorporated by reference.

In the process of the invention, the acid solution is introduced into the formation and the acid is permitted to flow through the formation. The pumping is then minimized or stopped and the pressure lowered on the formation which causes the fracture(s) to close. As the fracture is healing, but prior to closure of the fracture, the water or brine solution is then pumped into the fracture at a pressure below the pressure at which the acid solution was introduced, but sufficient to cause the water or brine to flow through the channels formed in the faces of the fractures. As the water or brine flows through the channels, mixing and dilution of the previously pumped acid occurs. The water or brine should be pumped into the formation at a rate equal to the fluid leakoff through the fracture. The diluted acid will subsequently dissolve more of the calcareous formation material.

In addition to their use in acid fracturing, the method of the invention is used in matrix acidizing. Matrix acidizing refers to the process of injecting formation stimulation fluid, such as acids, that react with minerals in the formation to increase the formation permeability. Matrix acidizing treatments of the prior art are hampered by radial penetration and axial distribution, neither of which are affected by the process of the present invention. Radial penetration is caused by the quick reaction of the acid with the wellbore coating upon introduction into the formation. Axial distribution refers to the ability to deliver the treatment fluid to the desired zone within the wellbore. Injection of the organic acid and subsequent treatment of water or brine causes dissolution of the calcareous materials which, in turn, causes a formation of a channel through the matrix. As the fluid is pumped into the formation, it tends to flow along the channel, leaving the rest of the formation untreated.

Further, the process of the invention may be applied to a subterranean formation after the completion of an acid fracturing or matrix acidizing procedure to re-stimulate production.

The organic acid solution may further contain conventional additives used in the treatment of subterranean formation to enhance the productivity of the formation or the wellbore, including, but not limited to, corrosion inhibitors, emulsifiers, surfactants, reducing agents (such as stannous chloride), friction reducers, iron control agents, and flowback additives may further be used. Such additives, when employed, are at lower concentrations conventionally used in the art. In fact, a high strength acetic acid system requires less of such additives than the HCl systems employed in the prior art.

In addition to the greater reactivity, the benefits of the method of the invention are numerous since the acid systems of the invention use acids (i.) with exceptional low corrosivity requiring much less, if any, corrosion inhibitor; for example, the corrosion rate for 29 wt % acetic acid at 125° C. on Cr-13 after 6 hours was 0.02 lbs/ft$^2$ using 0.2% inhibitor versus about 0.005 lbs/ft$^2$ using 1.0% inhibitor; (ii) that reduce the risk of wellbore damages, particularly from emulsions and iron precipitates; (iii) that are biodegradable; (iv) that are inherently compatible with chrome steel and other exotic metallurgy (no risk of chloride stress corrosion); (v) that, once prepared, are much less dangerous to personnel and equipment than mineral acids; (vi) that have less requirement to be neutralized prior to disposal or export to production plant facilities via pipeline, etc. because of their benign nature, etc.; (vii) that are capable of dissolving the requisite amounts of carbonate rock; and (viii) having inherent iron control properties (owing to buffering or other effects when citrates, erythorbates, ascorbates, etc. are used as one, or all, of the buffering salts).

FIG. 1 shows the data published by Chatelain as the percentage of initial acid strength converted. While FIG. 1 demonstrates that 15% acetic acid has an efficiency of about 58% at 77° F., a 2% solution has an efficiency of greater than 90%. The process of the invention with a 29% acetic acid solution, which has a theoretical reactivity efficiency of between 50 to 55% at 77° F. and 30 to 35% at 300° F., when pumped into a pack of calcium carbonate under 800 psi pressure and followed with fresh water at various rates, demonstrates an efficiency increase of 10 to 50%.

The following examples will illustrate the practice of the present imvention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

Example 1

Calcite (±98% purity), in the form of marble sand, was placed into a reaction chamber. Deionized water was then pumped through the chamber to remove air. Backpressure of 800 psi was applied and additional deionized water was then pumped through the chamber, until a steady rate was established, followed by 200 ml of 5M acetic acid from a piston accumulator. Samples were taken from the water effluent in 50 ml increments. Deionized water was then injected into the sandpack in the reaction chamber. Pumping was continued or a shut-in (or soak-in) period was observed prior to pumping the deionized water.

Samples of the effluent were taken at 50 ml and 100 ml increments until the pH had either returned to or approached a pH of about 7.0. Samples were analyzed for calcium using either direct current plasma (DCP) spectrophotometer or (ICP) spectrophotometer. The pH of the samples was also measured and recorded. Injection rates varied from 5 to 20 mls/min. Backpressure was also varied from 0 to 800 psi. In order to determine whether all initial reaction of the 5M acetic acid had taken place the shut-in time prior to injection of the deionized water for dilution was varied from 0 to 90 minutes. Calcium dissolution was shown to be unaffected by shut-in time at elevated temperatures.

Figure 2:
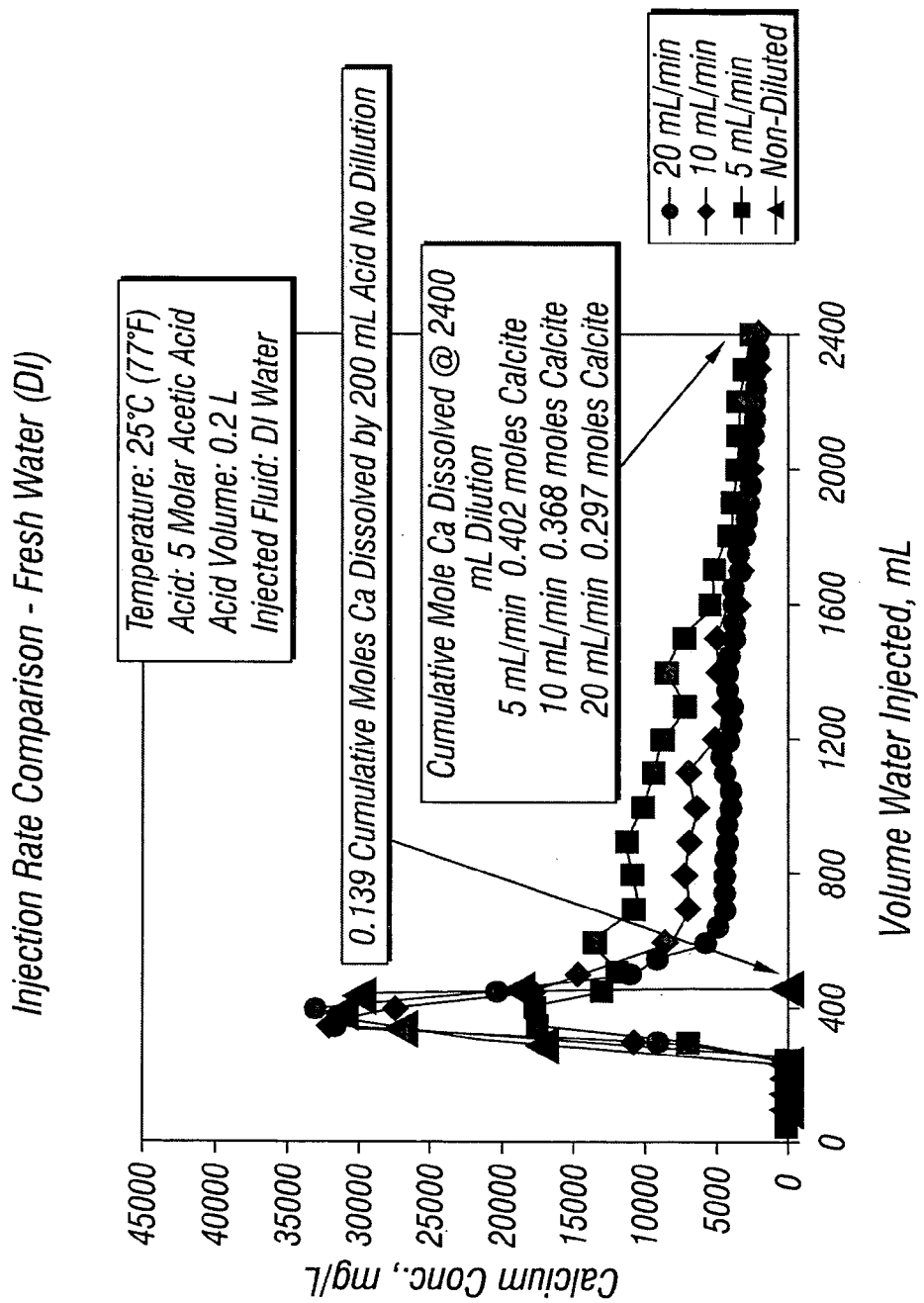
FIGS. 2 through 4 illustrate the cumulative calcium in solution from the pumping in of the acetic acid and recovery without dilution and the dilution at three different rates at three different temperature conditions.
Figure 3:
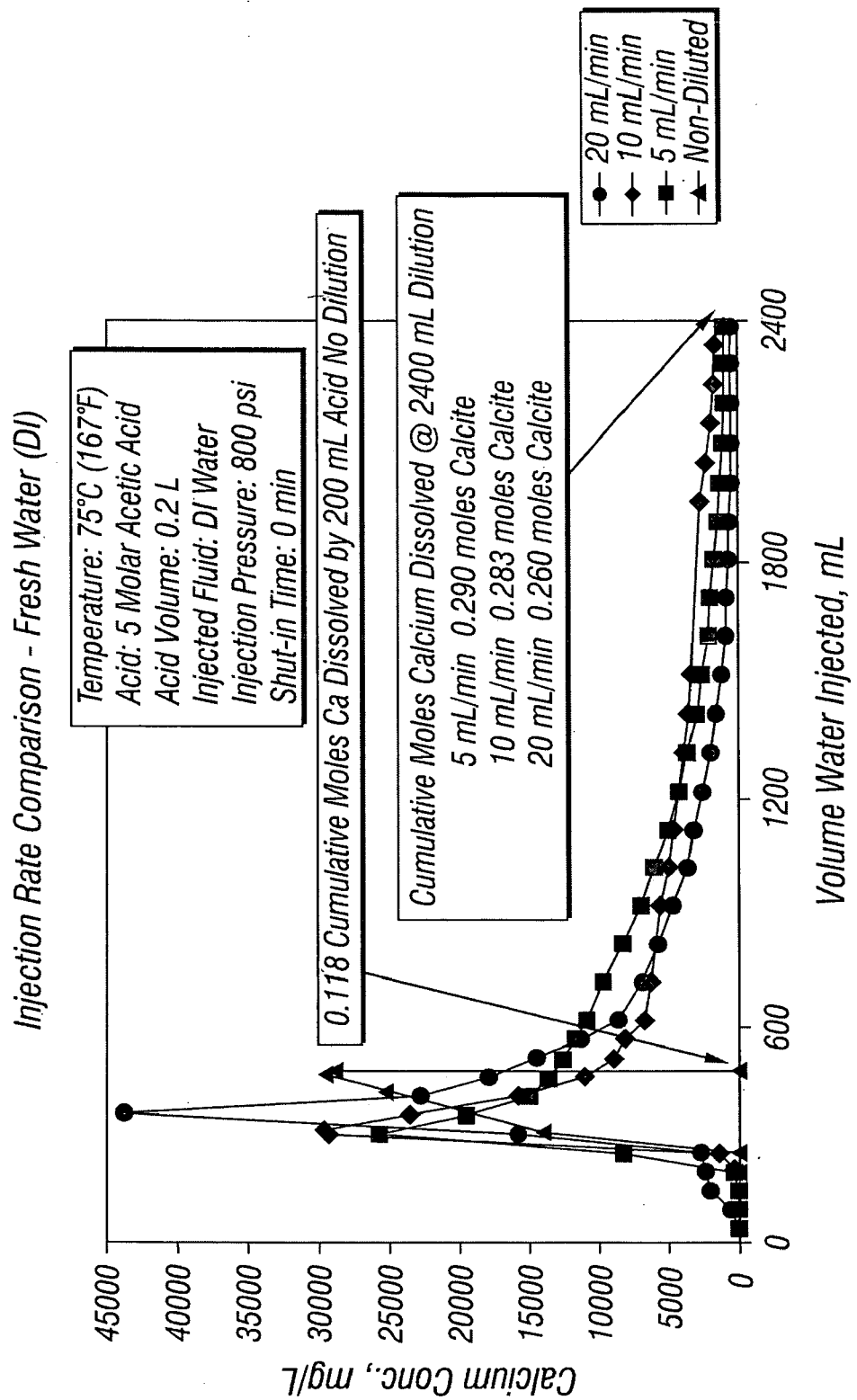
Figure 4:
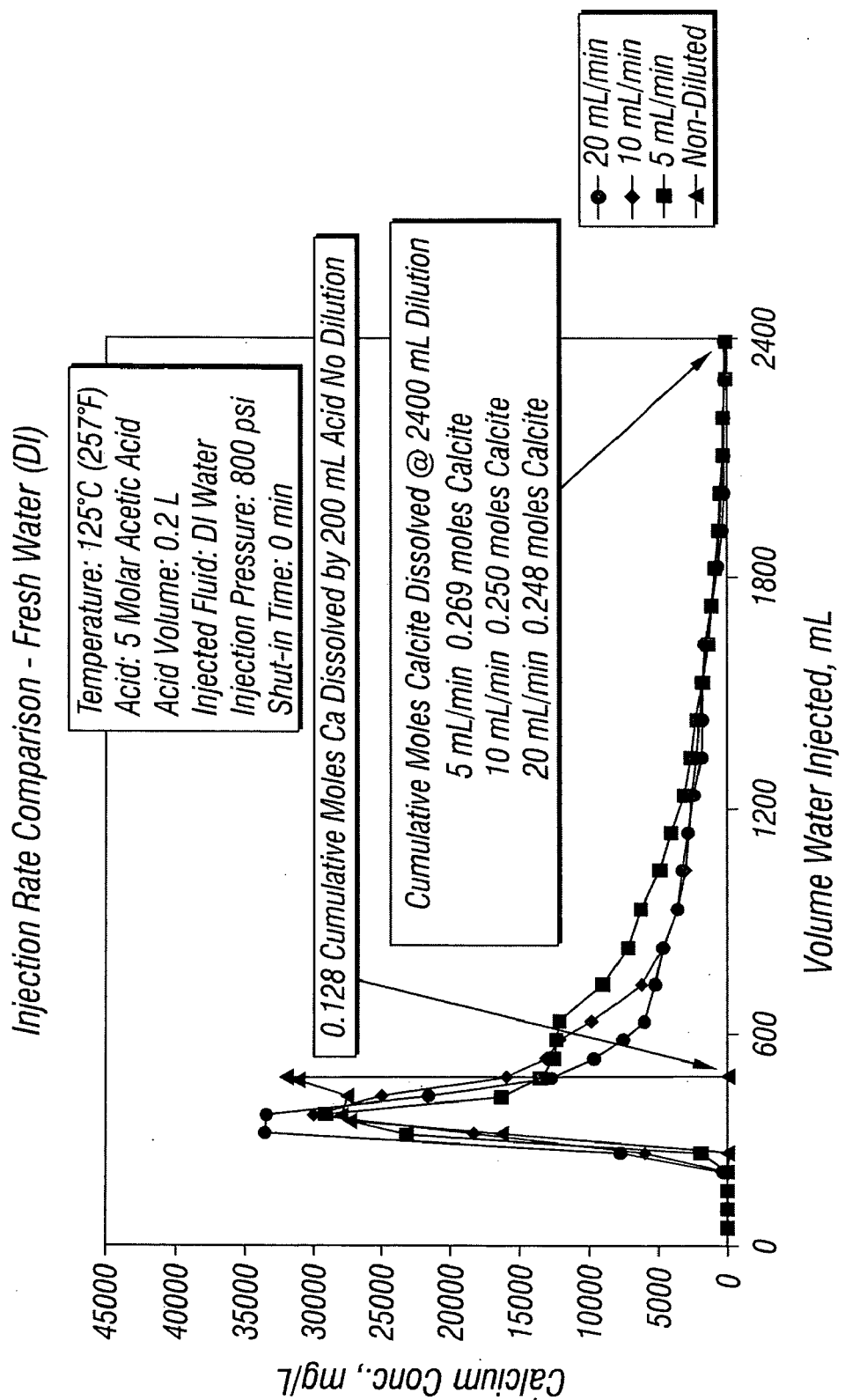

The tests were performed at 25°, 75° and 125° C. (77°, 167° and 257° F.). The concentration of calcium in the solution is graphically displayed in FIG. 2 (25° C.), FIG. 3 (75° C.) and FIG. 4 (125° C.). FIG. 2 shows that if 200 ml. of 5 M acetic acid is pumped into the calcite in the reaction chamber and recovered without any dilution, a total of 0.139 moles of calcium are dissolved cumulative at 25° C. This is compared to the three tests where the injection rate was varied from 5 to 20 ml/min and 2400 ml. of deionized water was pumped through the calcite in the reaction chamber behind the 200 ml. of 5M acetic acid to dilute it. These totals of calcium dissolved were 0.402 to 0.297, respectively. FIGS. 3 and 4 illustrate the same test results but at 75° C. and 125° C., respectively.

Figure 5:
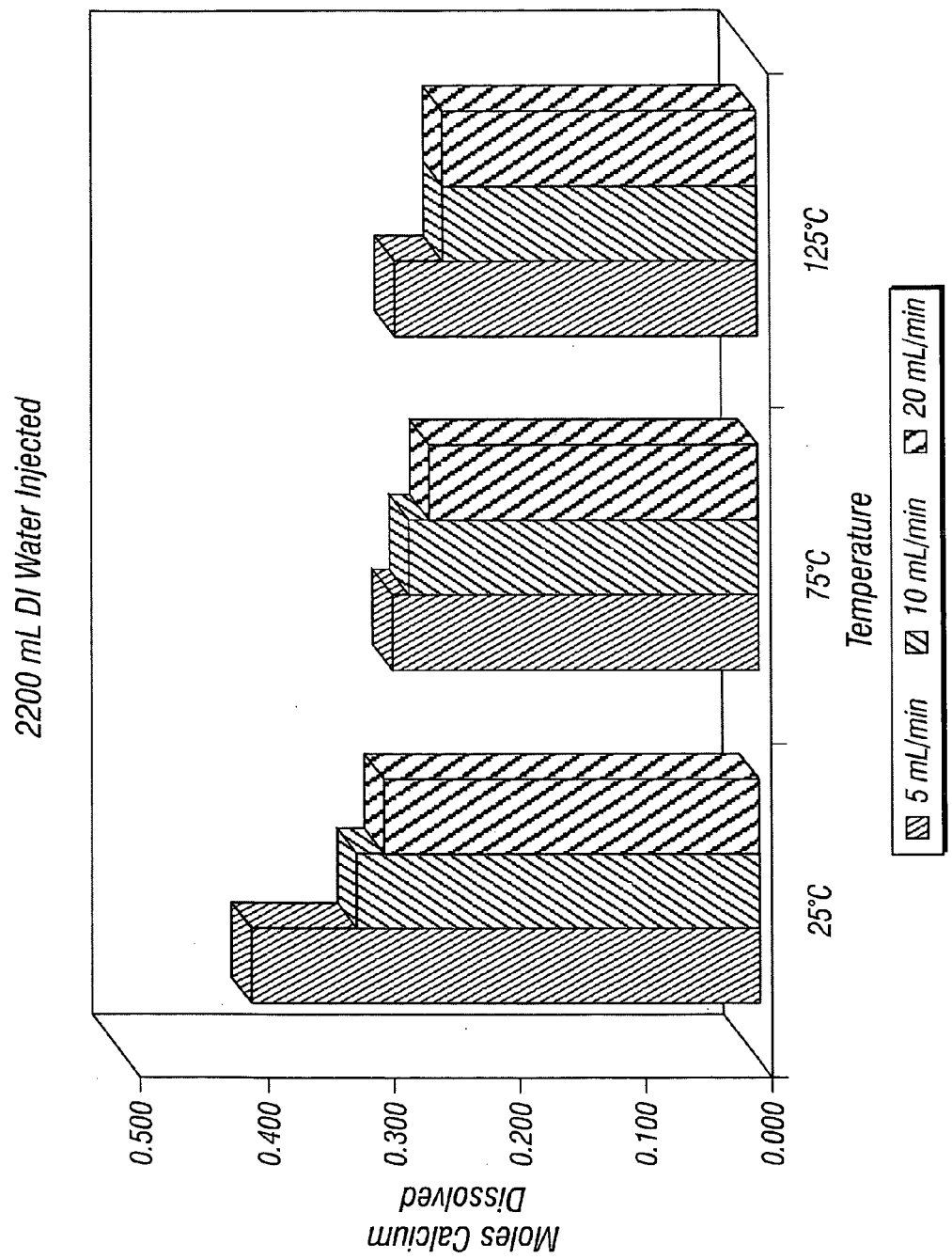
FIG. 5 compares the number of moles of calcium dissolved as a function of the dilution rate as set forth in Example 1.

FIG. 5 compares the effect of dilution rate on the cumulative moles of dissolved calcite at 25°, 75°, and 125° C. These tests illustrate that the reduced injection rate allows for more complete mixing and longer contact time, resulting therefore in more calcite dissolution. Since these tests were run in only one direction, there is limited rock contact. In field use, the fluids would be pumped into the reservoir and then recovered back through the same rock. Thus, a greater contact time and larger quantity of carbonate dissolved would be noted.

Figure 6:
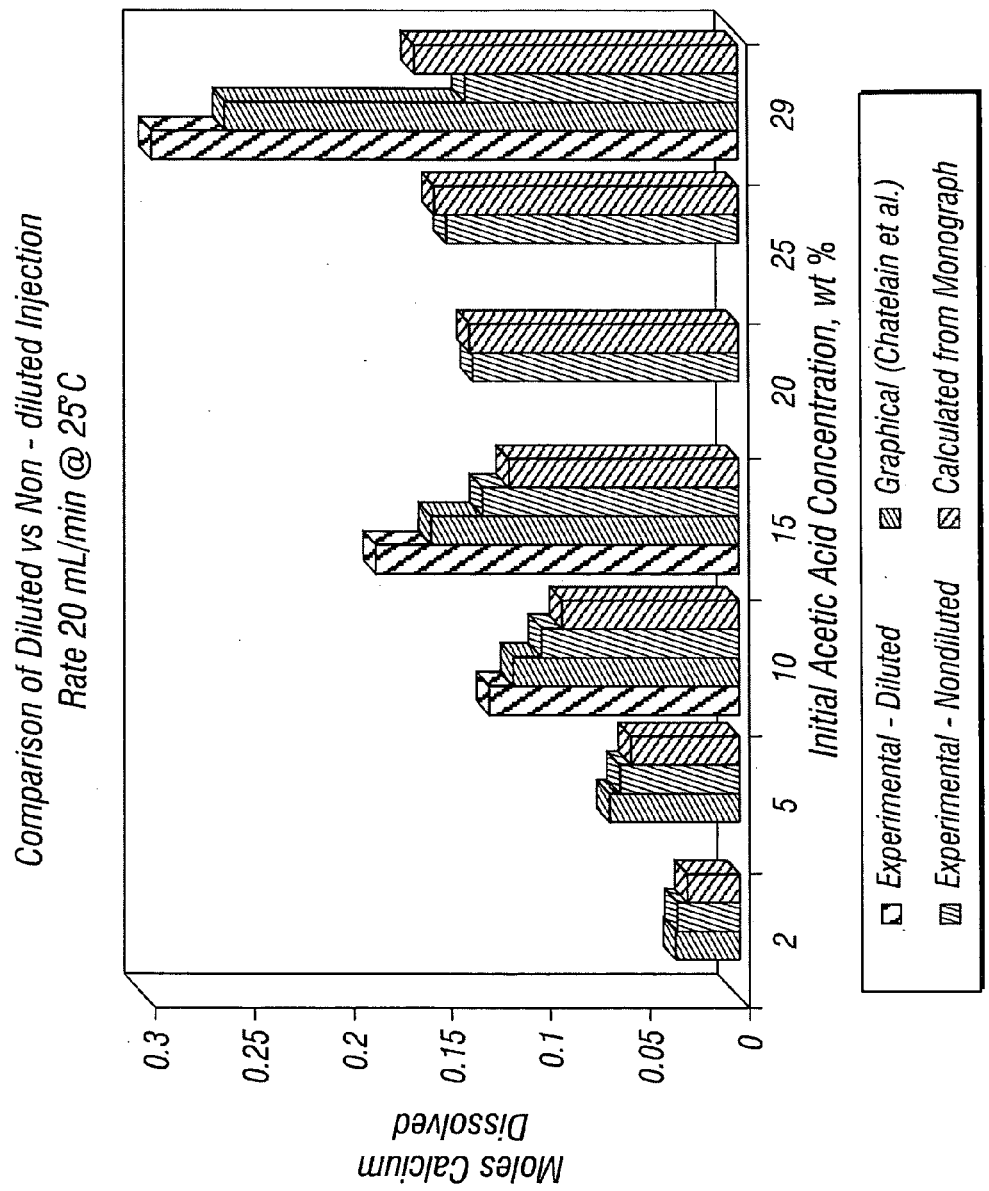
FIG. 6 sets forth the relationship of amount of dissolved calcium per initial acetic acid concentration in diluted and non-diluted injections.

FIG. 6 illustrates the comparison of the cumulative moles of calcite dissolved, based on initial acetic acid strength, versus those values to shown in the acid monograph of FIG.

1 and those calculated and extrapolated from the data of Chatelain. The tests where dilution was employed, after the initial placement of the 200 ml. of 10, 15 and 29 wt % acetic acid, demonstrated greater cumulative calcium dissolution than those projected from calculations or observed in FIG. 1. In particulate, the cumulative calcium dissolved by 200 ml. of 29 wt % acetic acid and not diluted was lower than the amount dissolved using 15 wt %, likely representative of the insolubility of calcium acetate under spent acid conditions Comparative Example 1

To compare the work of Chatelain relating to equilibrium determinations to actual pump in and recovery, 5M acetic acid was pumped into the reaction chamber at 20 ml/min under 800 psi and reversed out with ISOPAR® isoparaffinic solvent to eliminate any aqueous dilution. The shut-in time was varied from 0 to 90 minutes.

A comparison of FIG. 5 with the equilibrium calculated dissolution amounts of calcium, in accordance with Chatelain, as set forth in Table II, shows that diluting the acid after placement resulted in improved dissolution from 14.2 to 65% than that projected from equilibrium calculations.

TABLE II

| Temperature, ° C. | Fraction Acid Converted | Moles Calcium Dissolved |
| --- | --- | --- |
| 25 | 0.520 | 0.260 |
| 75 | 0.385 | 0.1925 |
| 125 | 0.326 | 0.163 |

Table III lists the moles of calcium observed with Comparative Example 1 (without dilution).

TABLE III

| | Shut-in time, minutes | | | |
| --- | --- | --- | --- | --- |
| Temperature | 0 | 30 | 60 | 90 |
| 25° C. (77° F.) | 0.092 | 0.169 | 0.181 | 0.194 |
| 75° C. (167° F.) | 0.118 | 0.186 | 0.190 | 0.183 |
| 125° C. (257° F.) | 0.128 | 0.192 | 0.188 | 0.198 |

Pumping of the acid into the rock and reversing the flow resulted in 22 to 65% reduction in calcium dissolved. The values obtained at 75° and 125° C. (167° and 257° F.) were nearly the same for all the shut-in times, while at 25° C. (77° F.) the amount of calcium dissolved increased approximately 15% from 30 to 90 minutes of shut-in.

Figure 7:
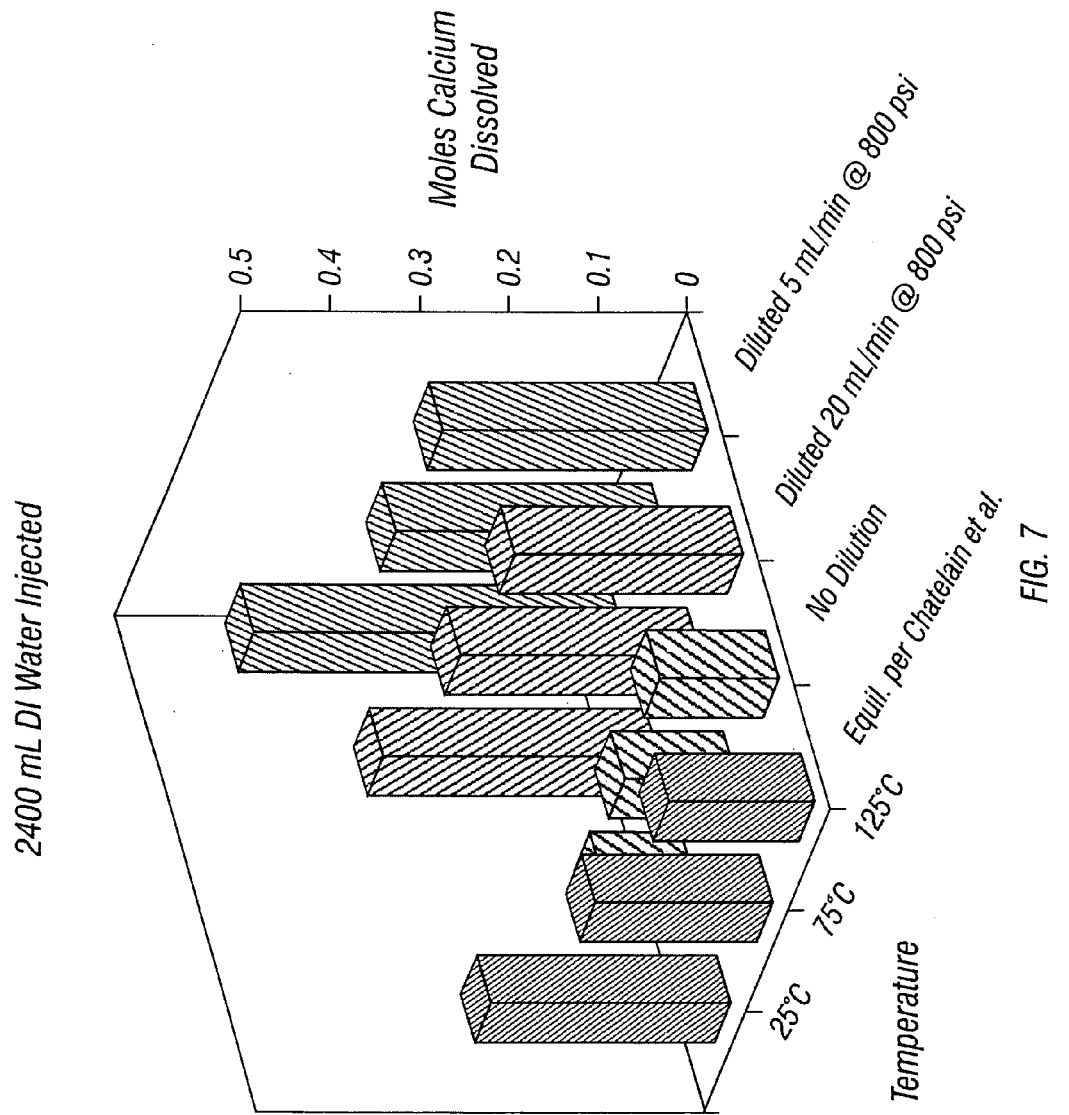
FIG. 7 compares the effect of no dilution and dilution on the number of moles of calcium dissolved in accordance with the teachings set forth in the Examples.

FIG. 7 compares the differences in the methods of moles of calcite recovered in the dissolution process and further summarizes the Examples wherein the projected results from Chatelain are compared to tests where the acid was first injected and then reversed out with ISOPAR and to two different rates of dilution. FIG. 7 demonstrates that, at 25° C., a simple placement of acid and recovery results in total calcite dissolution of less than 0.1 moles while previous work shows dissolution of greater than 0.2 moles. The dilution of previously placed acid shows cumulative moles of calcite dissolved ranging from almost 0.3 at 20 milliliters per minute to almost 0.4 at 5 ml/min.

The Examples illustrate that dilution of the organic acid in the subterranean carbonate formation results in a larger amount of carbonate being dissolved and that reduction of the injection rate of the dilution water enhances the mix and dissolution of the carbonate. A comparison of equilibrium based calculated reaction efficiency to just pumping acid into a formation, followed by fluid recovery, demonstrated a reduction in total reactivity of 22 to 65%. Further, equilibrium calculations of the extent of calcium dissolution are overly optimistic compared to actual pump in and recovery measurements. After pumping the acid into the formation and prior to recovery, a shut-in time allowed for more complete reaction. This allowed the reaction to approach and, in the case of the tests at 125° C. (257° F.), even exceed the equilibrium-calculated amount of calcium dissolved. With no shut-in time, a 14 to 65% increase in efficiency was observed by dilution. Variance in shut-in times prior to dilution demonstrated essentially little difference in the reaction efficiency. Further, the shut-in time, though an enhancement to the process, is controlled by the solubility of the salts formed.

The invention thus has particular applicability in wells with high bottomhole temperatures and/or which contain chrome piping, where it is difficult to use HCl because of corrosion control issues; acetic acid being easier to control corrosion even at high concentrations.

From the foregoing, it will be observed that numerous variations and modifications may be effected without departing from the true spirit and scope of the novel concepts of the invention.

What is claimed is:

1. A method for removing or dissolving calcareous materials in a subterranean formation or in a wellbore which comprises:
   (a.) injecting into the formation or wellbore an aqueous acid solution comprising between from about 15 to about 99 weight percent of an organic acid selected from the group consiting of formic acid, acetic acid and mixtures thereof; and
   (b.) injecting water or brine into the formation or wellbore in an amount sufficient to reduce the concentration of organic acid in the formation or wellbore to no greater than 10 weight percent.

2. The method of claim 1, wherein the calcareous materials are carbonate materials.

3. The method of claim 2, wherein the acid solution injected into the formation or wellbore comprises between from about 25 to about 99 weight percent of acetic acid.

4. The method of claim 3, wherein the concentration of acetic acid in the acid solution is approximately between from about 25 to about 35 weight percent.

5. The method of claim 2, wherein the acid solution injected into the formation or wellbore comprises between from about 15 to about 95 weight percent of formic acid.

6. The method of claim 5, wherein the concentration of formic acid in the acid solution is approximately between from about 20 to about 40 weight percent.

7. The method of claim 2, wherein the aqueous acid solution further comprises a corrosion inhibitor.

8. The method of claim 1, wherein the water injected into the formation or wellbore is fresh water, seawater or brine.

9. The method of claim 1, wherein the amount of water injected into the formation or wellbore is an amount sufficient to reduce the concentration of organic acid within the formation or wellbore to no greater than 5 weight percent.

10. The method of claim 9, wherein the amount of water injected into the formation or wellbore is an amount sufficient to reduce the concentration of organic acid within the formation or wellbore to no greater than 3 weight percent.

11. The method of claim 1, wherein the aqueous acid solution is injected into the formation or wellbore at a rate sufficient so as to maximize the dissolution of the calcareous material.

12. A method of fracturing a subterranean formation which comprises:
   (a.) injecting into the formation an aqueous acid solution comprising an organic acid selected from the group consisting of formic acid, acetic acid and mixtures thereof; and
   (b.) injecting water into the formation in an amount sufficient to reduce the concentration of organic acid in the formation, wherein the amount of water introduced into the formation is an amount sufficient to dilute the volume percent of the injected organic acid solution to at least between from about 2 to about 20 times its initial volume.

13. The method of claim 12, wherein the subterranean formation is a carbonate.

14. The method of claim 13, wherein the amount of water injected into the formation is an amount sufficient to reduce the concentration of organic acid in the formation to no greater than 10 weight percent.

15. The method of claim 14, wherein the aqueous acid solution injected into the formation comprises between from about 25 to about 99 weight percent of acetic acid.

16. The method of claim 14, wherein the amount of water injected into the formation is an amount sufficient to reduce the concentration of organic acid in the formation to no greater than 5 weight percent.

17. The method of claim 16, wherein the amount of water injected into the formation is an amount sufficient to reduce the concentration of organic acid in the formation to no greater than 3 weight percent.

18. The method of claim 13, wherein the aqueous acid solution injected into the formation comprises between from about 15 to about 95 weight percent of formic acid.

19. A method for enhancing the productivity of a subterranean formation or wellbore comprising:
   (a.) injecting into the subterranean formation or wellbore an aqueous acid solution comprising between from about 15 to about 99 weight percent of an organic acid selected from the group consisting of formic acid, acetic acid and mixtures thereof; and
   (b.) injecting water into the subterranean formation or wellbore in an amount sufficient to reduce the concentration of organic acid in the subterranean formation or wellbore, wherein the amount of water introduced into the formation is an amount sufficient to dilute the volume percent of the injected organic acid solution to at least between from about 2 to about 20 times its initial volume.

20. The method of claim 19, wherein the subterranean formation is a carbonate.

21. The method of claim 19, wherein the amount of water injected into the subterranean formation or wellbore is an amount sufficient to reduce the concentration of organic acid in the subterranean formation or wellbore is to no greater than 10 weight percent.

22. The method of claim 19, wherein the aqueous acid solution injected into the subterranean formation or wellbore comprises between from about 25 to about 99 weight percent of acetic acid.

23. The method of claim 19, wherein the aqueous acid solution injected into the subterranean formation or wellbore comprises between from about 15 to about 95 weight percent formic acid.

24. The method of claim 21, wherein the amount of water injected into the subterranean formation or wellbore is an amount sufficient to reduce the concentration of organic acid in the subterranean formation or wellbore to no greater than 5 weight percent.

25. A method for increasing the efficiency of organic acids introduced into subterranean formation or a wellbore which comprises:
   (a.) injecting into the formation or wellbore an aqueous acid solution comprising between from about 15 to about 99 weight percent of an organic acid selected from the group consisting of formic acid, acetic acid and mixtures thereof; and
   (b.) injecting water or brine into the formation or wellbore in an amount sufficient to reduce the concentration of organic acid in the formation or wellbore to no greater than 10 weight percent.

26. The method of claim 25, wherein the acid solution injected into the formation or wellbore comprises between from about 25 to about 99 weight percent of acetic acid.

27. The method of claim 26, wherein the concentration of acetic acid in the acid solution is approximately between from about 25 to about 35 weight percent.

28. The method of claim 25, wherein the acid solution injected into the formation or wellbore comprises from about 15 to about 95 weight percent of formic acid.

29. The method of claim 28, wherein the concentration of formic acid in the acid solution is approximately between from about 20 to about 40 weight percent.

30. The method of claim 25, wherein the water injected into the formation or wellbore is fresh water, seawater or brine.

31. The method of claim 25, wherein the amount of water injected into the formation or wellbore is an amount sufficient to reduce the concentration of organic acid within the formation or wellbore to no greater than 5 weight percent.

* * * * *